Aug. 14, 1962 W. J. BERGEN 3,049,090
SLEEP-PREVENTING ALARM FOR A MOTOR VEHICLE DRIVER
Filed Dec. 19, 1960 2 Sheets-Sheet 1
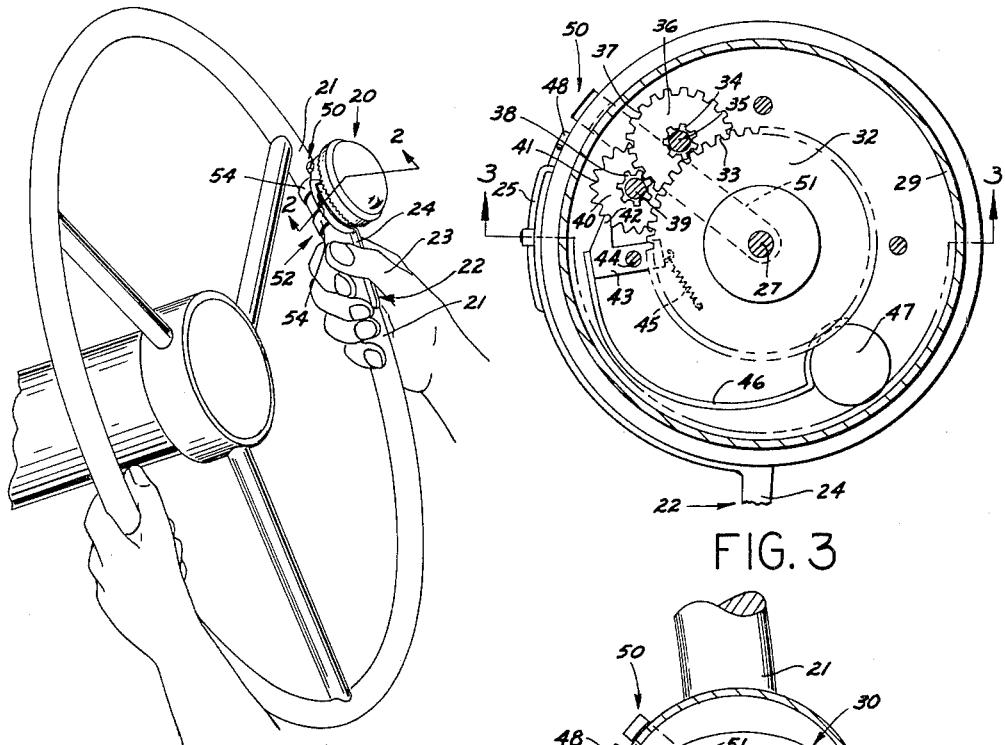
FIG. 3
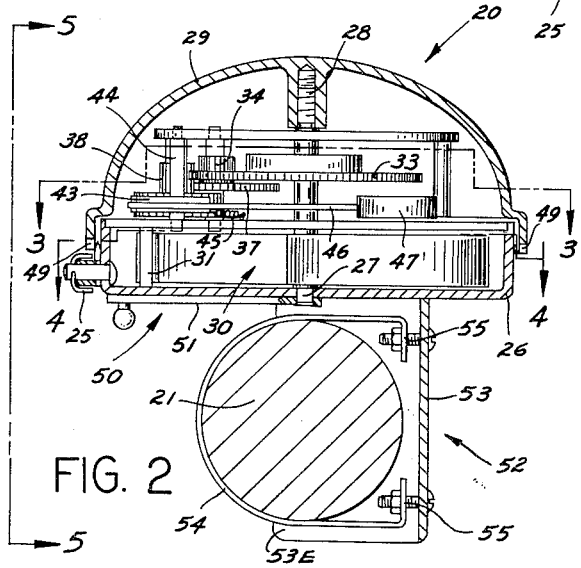
FIG. 1
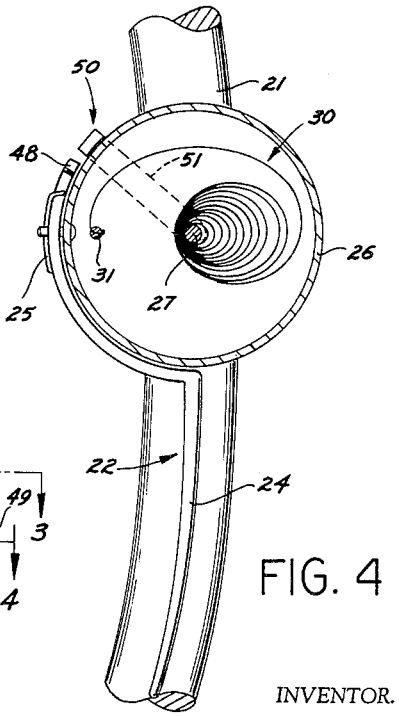
FIG. 4
FIG. 2
INVENTOR.
WILLIAM J. BERGEN Aug. 14, 1962 W. J. BERGEN 3,049,090
SLEEP-PREVENTING ALARM FOR A MOTOR VEHICLE DRIVER
Filed Dec. 19, 1960 2 Sheets-Sheet 2
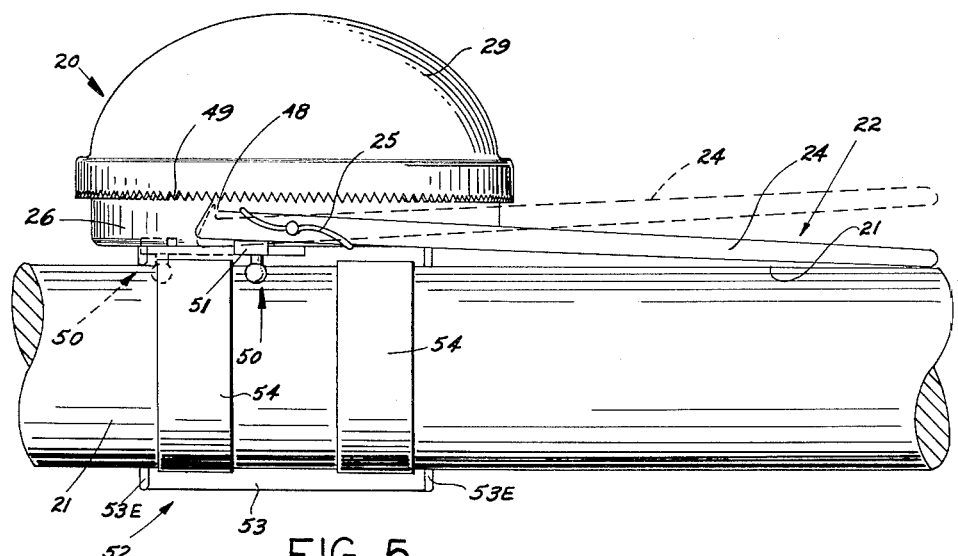
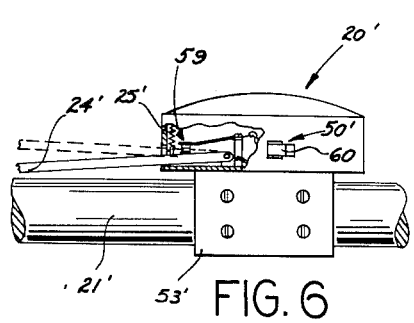
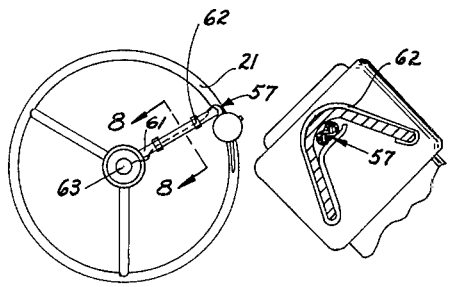
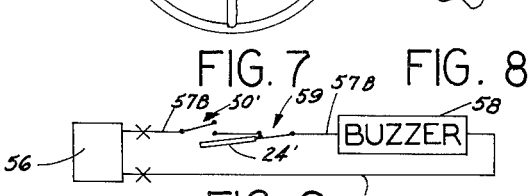
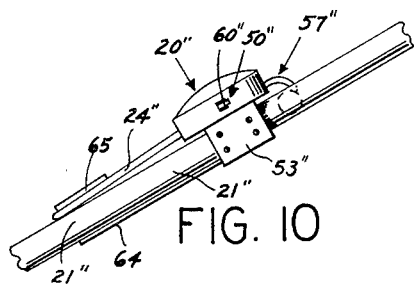
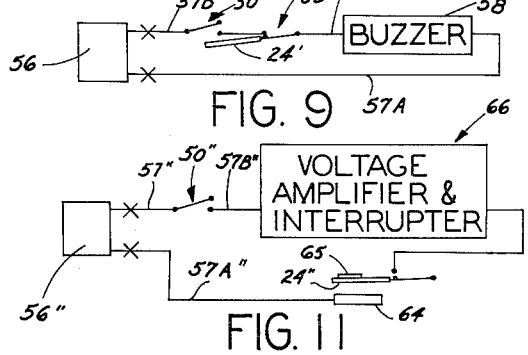
INVENTOR.
WILLIAM J. BERGEN United States Patent Office 3,049,090
Patented Aug. 14, 1962

3,049,090
SLEEP-PREVENTING ALARM FOR A MOTOR
VEHICLE DRIVER
William J. Bergen, 8035 Hemet Place,
Los Angeles 46, Calif.
Filed Dec. 19, 1960, Ser. No. 76,949
6 Claims. (Cl. 116—67)

The present invention consists of a sleep-preventing alarm for a motor vehicle driver adapted to produce a perceptible signal, such as an audible signal, a visibly observable signal, a mild electric shock, or any other desired type of signal whenever the driver's hand grasping a portion of a steering wheel of a motor vehicle loosens its grip such as normally occurs when a driver inadvertently falls asleep while driving the vehicle. In other words, when the driver is driving on long stretches of road and has his hand on a portion of the steering wheel carrying the device of the present invention, his grasp will normally render the alarm inactive, but relaxation of his grasp without purposely shutting off the alarm will cause it to produce a perceptible signal such as to immediately awaken the driver if he has inadvertently fallen asleep or has dozed off.

It should be noted that the alarm of the present invention will not produce a perceptible signal when the driver's hand is removed from the steering wheel if the driver has purposely deactivated it or shut it off. The driver will normally activate the alarm when he begins driving under conditions conducive to sleep, such as when driving at night on long stretches of open highway, which is a combination of conditions very apt to cause a driver to fall asleep. On the other hand, when the driver is fully awake and is driving through a city, or the like, where the stop and go nature of the driving will normally prevent him from falling asleep, the driver may deactivate the alarm, if desired.

It is an object of the present invention to provide a sleep-preventing alarm for a motor vehicle driver of the character referred to above, which is of extremely simple, cheap, foolproof construction such as to be conducive to widespread use thereof—particularly by drivers of buses, trucks, and other motor vehicles during long periods of driving on long stretches of highway.

Further objects are implicit in the detailed description which follows hereinafter and will be apparent to persons skilled in the art after a careful study thereof.

For the purpose of clarifying the nature of the present invention, several exemplary embodiments are illustrated in the hereinbelow-described figures of the accompanying two sheets of drawings and are described in detail hereinafter.

FIG. 1 is a fragmentary oblique view of one illustrative embodiment of the present invention shown in mounted relationship on a motor vehicle steering wheel. This view shows the driver grasping the steering wheel and the alarm device of the present invention in the normal manner which inactivates the alarm but which will allow the alarm to become automatically activated whereby to produce a perceptible signal if the driver's right relaxes its grip, such as would occur if the driver inadvertently fell asleep while driving.

FIG. 2 is a larger scale sectional view taken in the direction of the arrows 2—2 of FIG. 1. This view shows the device in normally, manually held inactivated position.

FIG. 3 is a fragmentary, staggered-plane, sectional view taken in the direction of the arrows 3—3 of FIG. 2. The mounting portion of the steering wheel is removed from this view for drawing simplification reasons.

FIG. 4 is a smaller-scale, staggered-plane, sectional view taken in the direction of the arrows 4—4 of FIG. 2.

FIG. 5 is a fragmentary, left side elevational view taken in the direction of the arrows 5—5 of FIG. 2 and shows, in solid lines, the manually operable inactivating means in the manually held inactivating position. This view also shows, in broken lines, the manually operable inactivating means in its normal ineffective position which will allow the alarm to produce a perceptible signal. In other words, the broken line position is that position which the inactivating means assumes automatically when the driver's grip thereon relaxes, such as would occur when the driver inadvertently falls asleep.

FIG. 6 is a fagmentary, partly broken-away, right side elevational view generally similar to FIG. 5 but as seen from the opposite side thereof and illustrating a slightly modified form of the invention which is electrically operable rather than mechanically operable.

FIG. 7 is a reduced-size elevational view of a steering wheel taken in direct alignment with the steering wheel post from a position thereabove and shows the modified form of the invention illustrated in FIG. 6 in mounted position on the steering wheel and with appropriate clamp means for mounting electric circuit means extending from the alarm to the steering wheel post for passage therethrough to a suitable source of electric power such as the motor vehicle's storage battery or other source of electric power.

FIG. 8 is a sectional view taken in the direction of the arrows 8—8 of FIG. 7.

FIG. 9 is a typical electrical schematic view of the modified form of the invention illustrated in FIGS. 6–8.

FIG. 10 illustrates a further modified form of the invention which is electrically energized and which is adapted to apply a mild interrupted shock to the hand of the sleeping driver whereby to awaken him.

FIG. 11 is a typical circuit schematic of the modified form of the invention illustrated in FIG. 10.

Referring to FIGS. 1–5 for exemplary purposes, one illustrative embodiment of the invention takes a typical exemplary form wherein it comprises perceptible sound-producing signal means, indicated generally at 20, adapted to be carried by a portion of a motor vehicle steering wheel, such as is indicated at 21, in a convenient position for use by a driver of a motor vehicle, such as is clearly shown in FIG. 1.

The perceptible sound-producing signal means 20 is effectively provided with manually forcibly operable means, indicated at 22, for controllably inactivating the perceptible sound-producing signal means 20 as long as the driver's hand 23 grasps the steering wheel portion 21 and the lever means 24 of the inactivating means 22 in a manner such as to depress said inactivating lever 24 into a position in contact with the steering wheel portion 21 as is best shown in the solid line position of the inactivating lever 24 in FIG. 5. It will readily be understood that as soon as the grip of the driver's hand 23 relaxes, such as would normally occur if the driver should inadvertently fall asleep while driving, the inactivating lever 24 will be partially or wholly released whereby to allow the biasing spring 25 to move it into the ineffective upper position shown in broken lines at 24 in FIG. 5, which will effectively result in activation of the perceptible sound-producing signal means 20 in a manner such that it will produce a loud ringing sound whereby to quickly awaken the dozing driver before he has an accident as a result of having dozed off while driving.

In the exemplary form of the invention illustrated in FIGS. 1–5, the perceptible sound-producing signal means 20 includes a base housing portion 26 rotatably carrying the lower end of a center post 27, which at its upper end is threadedly attached as indicated at 28 to a curved upper housing portion 29 of metallic material and which effectively comprises a bell type of sound-producing means adapted to produce an audible bell-like ringing sound when struck by suitable hammer means.

The device also includes a spring motor, indicated generally at 30, comprising a spirally wound spring having one end connected to a fixed post 31 carried by the lower housing portion 26 and having the other end connected to the rotatable center post 27 whereby to effectively rotate said center post 27 and parts attached thereto (which will be subsequently described) whenever free for such rotation as a result of movement of the inactivating lever 24 into the ineffective broken line position shown in FIG. 5.

The rotatable center post 27 has attached thereto a gear 32 having gear teeth 33 in driving engagement with teeth 34 of a small gear 35 which is connected to and drives an under-lying larger gear 36, which has its teeth 37 in driving engagement with the teeth 38 of another small gear 39, which is connected to a large toothed interrupter wheel 40 which has its serrated teeth or tooth means 41 in engagement with a spring-biased pawl or dog 42.

It should be noted that the spring biased pawl or dog 42 is carried by a member 43 which is pivotally mounted on a pivot pin 44 and which has its opposite end provided with a biasing spring 45.

The above provides an arrangement whereby the pawl or dog 42 is normally biased into engagement with the serrated tooth means 41, but as the toothed interrupter wheel 40 is rotated as a result of the operation of the spring motor 30, the pawl or dog 42 is moved inwardly and outwardly along the contours of the serrated tooth means 41, thus moving the cantilever extension arm 46 in a manner such as to intermittently move the hammer 47 into sound-producing contact with the interior of the sound-producing bell-type upper housing cover 29.

In other words, whenever the spring motor 30 is free to rotate the center post 27 and all parts connected thereto, the hammer 47 intermittently strikes the sound-producing bell-type cover 29 and produces a loud ringing sound which will quickly awaken a dozing driver.

This will be prevented whenever the inactivating lever 24 is moved against the action of the biasing spring 25 from the broken line position shown in FIG. 5 into the solid line position shown in FIG. 5, which will cause the stop portion 48 of the inactivating lever 24 to engage an engaging element of the rotatable assembly which is shown as comprising the serrated tooth means 49 carried by the rotatable upper housing portion 29.

When the above occurs, the entire rotative assembly is immobilized. This is a condition which normally exists when a driver's hand 23 grasps the steering wheel portion 21 and the inactivating lever 24 in the position shown in FIG. 1.

However, when the driver's grip relaxes, the biasing spring 25 moves the inactivating lever 24 outwardly into the broken line position shown in FIG. 5 and the entire rotatable assembly is free to rotate under the action of the spring motor 30, which will, therefore, intermittently move the hammer 47 into sound-producing contact with the bell-type sound-producing top cover portion 29.

This bell-like alarm sound will continue to be produced until either the driver awakens and firmly grasps the inactivating lever 24 and the steering wheel portion 21 again, or until the driver chooses to deactivate the entire device by deactivating means, such as is indicated generally at 50, which is shown as comprising a lever 51 pivotally mounted to the bottom of the center post 27 and controllably movable into underlying engagement with the forward end of the inactivating lever 24 whereby to force the stop means 48 upwardly into locking engagement with the serrated tooth means 49, as is shown in the solid line position of the deactivating lever 51 shown in FIG. 5. It will readily be understood that when the driver wishes to reactivate the alarm 20, he merely moves the deactivating lever 51 forwardly from the solid line position shown in FIG. 5 into the broken line position, which releases the inactivating lever 24 for normal operation in the manner previously described.

The entire unit is mounted by suitable mounting means, indicated generally at 52, on the motor vehicle steering wheel portion 21. In the example illustrated, the mounting means 52 comprises a downwardly extending side plate or bracket member 53 carried by the bottom housing portion 26 and provided with a pair of encompassing straps 54 adapted to be passed around the steering wheel portion 21 and fastened by suitable threaded fastener means 55 in a tightly clamped manner against the arcuately curved end plates 53E whereby to rigidly mount the device on the steering wheel portion 21.

FIGS. 6–9 illustrate a slightly modified form of the invention wherein similar parts are indicated by similar reference numerals, primed, however.

In this modification, the sound-producing signal means, indicated generally at 20', is of an electrical type and is adapted to be energized from a suitable source of electric power such as a motor vehicle storage battery of the type indicated at 56 in FIG. 9 which is adapted to be connected by leads 57A and 57B to an electrically energizable sound-producing buzzer 58, with the deactivating switch means 50' and the normally spring-biased closed inactivating switch means indicated generally at 59 being connected in series therewith. It should be noted that the inactivating lever 24' is mechanically connected in operating relationship with respect to the inactivating switch means 59 whereby to hold it open when the inactivating lever 24' is moved into the depressed position shown in solid lines in FIG. 6 immediately adjacent to the steering wheel portion 21' against the action of a biasing spring 25', which will return the inactivating lever 24' to the outer or upper broken line position and which will correspondingly close the inactivating switch 59 when the driver's hand relaxes its grip thereon, such as when the driver falls asleep temporarily while driving. It should be noted that when this occurs, closure of the inactivating switch 59, assuming that the switch 50' has been previously closed to render the entire device capable of operation, will cause the battery 56 to electrically energize the sound-producing buzzer 58 whereby to produce a loud buzzing sound which will immediately awaken a dozing driver.

On the other hand, when the driver awakens and again firmly grasps the inactivating lever 24' and the steering wheel portion 21', the inactivating switch 59 will be opened and will de-energize the buzzer 58.

The switch 50' is provided with an externally positioned actuating portion 60 which can be snapped into switch-open position or switch-closed position for the purpose of rendering the entire device completely inoperative when the driver does not wish to use it, or for the purpose of placing it in operative position when the driver wishes to use the sleep-preventing alarm.

The leads 57A and 57B extend from the buzzer 58, which is positioned within the alarm body 20', along the underside of the adjacent spoke 61 of the steering wheel 21' and are held in position by any suitable mounting means such as the clamp 62, for example, although not specifically so limited. The leads together form a conventional two-lead electric wire cord, indicated generally at 57, which has its inner end connected to the central steering post portion 63 for passage therethrough into another portion of the motor vehicle for connection to the battery 56. On the other hand an auxiliary small battery may actually be carried by the alarm 20' if desired and the external leads may be eliminated.

FIGS. 10 and 11 illustrate a further slight modification of the invention which is also adapted to be electrically energized, and portions similar to those illustrated in the first modification shown in FIGS. 6–9, are indicated by similar reference numerals, doubly primed, however. In this modification, the signal means actually comprises manually engageable electric contact means 64 connected to the lead 57A" and another electric contact means 65 carried by the inactivating lever 24″. It should be noted that the electric contact means 64 is positioned underneath the manually graspable steering wheel portion 21″ on the opposite side thereof from the inactivating lever 24″ whereby a driver grasping the steering wheel portion 21″ and squeezing the inactivating lever 24″ into the depressed position, which effectively opens the inactivating switch 59″, will have opposed portions of his hands in electrical engagement with the two electric contact means 64 and 65 whereby relaxation of the driver's grip thereon to an extent such as to allow the spring-biased inactivating lever 24″ to move outwardly, will cause closure of the inactivating switch means 59″ and, when the switch 50″ is closed, will cause amplified electric current from the battery 56″ to flow through the driver's hand and give him an electric shock which will be interrupted after a predetermined time as a result of the action of the voltage amplifier and interrupter, indicated generally at 66, connected in series between the battery 56″ and the electrical contact means 64 and 65. Any conventional type of voltage amplifier and any conventional type of interrupter may comprise the unit shown in block diagrammatic form at 66. This provides an arrangement where relaxation of the driver's grip when he falls asleep gives him a mild and interrupted shock which will quickly awaken him. The deactivating switch means 50″ operates in the same manner as that described hereinbefore in connection with the version of the invention illustrated in FIGS. 6–9.

It should be noted that the invention is not limited to a sound-producing or electric shock-producing type of perceptible signal means, but may employ any type of signal means which can be readily perceived by the dozing driver.

I claim:

1. A sleep-preventing alarm for a motor vehicle driver, comprising: perceptible signal means; manually operable means for controllably inactivating said perceptible signal means only when manually operated; said perceptible signal means comprises a spring motor provided with and drivingly coupled to a rotatable element, said rotatable element being provided with engaging means for engagement with said inactivating means whereby to rotatively immobilize said rotatable element when engaged by said inactivating means and whereby said spring motor will rotate said rotatable element when said inactivating means is manually disengaged from said engaging means, said rotatable element being provided with means for converting rotary movement thereof into intermittent movement and being provided with and coupled to hammer means for intermittently operating same in response to rotation of said rotatable element, and sound-producing means adapted to be intermittently struck by said hammer means in response to rotation of said rotatable element whereby to produce an audible signal and mounting means for mounting said inactivating means on a portion of a steering wheel of a motor vehicle in a position such as to be adapted to be manually gripped, together with said steering wheel, by a driver of the motor vehicle whereby to normally inactivate the perceptible signal means as a result of said driver gripping said steering wheel and inactivating means during the driving of the motor vehicle, and whereby relaxation of said manual gripping of said steering wheel and inactivating means, when said driver inadvertently falls asleep while driving the vehicle, will result in activation of said perceptible signal means for the purpose of awakening the driver before an accident occurs.

2. Apparatus of the character defined in claim 1, wherein said means for converting rotary movement of said rotatable element into intermittent movement of said hammer comprises reduction gearing means provided with serrated tooth means and additionally includes pivotally mounted projecting dog means spring biased into engagement with said serrated tooth means and connected to said hammer means.

3. Apparatus of the character defined in claim 1, wherein said inactivating means comprises lever means normally spring biased into signal-activating position and provided with a stop portion controllably manually movable into stopping engagement with said engaging means of said rotatable element.

4. Apparatus of the character defined in claim 3, wherein said engaging element of said rotatable element comprises serrated tooth means adapted to engage said stop means of said inactivating lever.

5. Apparatus of the character defined in claim 4, including overriding deactivating means for rendering the perceptible signal means inoperable.

6. Apparatus of the character defined in claim 5, wherein said deactivating means comprises a pivotally mounted member controllably movable into engagement with said inactivating lever means in a manner forcing it into stopping engagement with said engaging means of said rotatable element.

References Cited in the file of this patent

UNITED STATES PATENTS

| | | |
|---|---|---|
| 1,881,878 | Nidy | Oct. 11, 1932 |
| 2,066,092 | Brown | Dec. 29, 1936 |
| 2,199,060 | Young | Apr. 30, 1940 |
| 2,888,668 | Colatriano | May 26, 1959 |